United States Patent
Perot et al.

(10) Patent No.: US 9,994,162 B2
(45) Date of Patent: Jun. 12, 2018

(54) ARRANGEMENT FOR MOUNTING A FUNCTIONAL COMPONENT SUCH AS A CAMERA ON A MOTOR VEHICLE BODYWORK ELEMENT

(71) Applicant: RENAULT s.a.s., Boulogne Billancourt (FR)

(72) Inventors: Patrick Perot, Voisins le Bretonneux (FR); Herve Michaud, Chartres (FR); Damien Godin, Marly le Roi (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 0 days. days.

(21) Appl. No.: 15/315,614

(22) PCT Filed: Apr. 17, 2015

(86) PCT No.: PCT/FR2015/051058
§ 371 (c)(1),
(2) Date: Jan. 25, 2017

(87) PCT Pub. No.: WO2016/001497
PCT Pub. Date: Jan. 7, 2016

(65) Prior Publication Data
US 2017/0182953 A1    Jun. 29, 2017

(30) Foreign Application Priority Data
Jun. 2, 2014   (FR) ...................... 14 54971

(51) Int. Cl.
*G03B 17/56* (2006.01)
*B60R 11/04* (2006.01)
(Continued)

(52) U.S. Cl.
CPC ............. *B60R 11/04* (2013.01); *F16M 13/02* (2013.01); *G03B 17/561* (2013.01);
(Continued)

(58) Field of Classification Search
CPC ..................................................... G03B 17/56
(Continued)

(56) References Cited

U.S. PATENT DOCUMENTS

| 6,588,638 | B1* | 7/2003 | Luebeck ................. | B60R 11/00 224/279 |
| 2002/0073518 | A1* | 6/2002 | Chesson ................ | B60J 5/0411 24/455 |
| 2008/0290672 | A1* | 11/2008 | Faass .................... | B60R 19/483 293/117 |

FOREIGN PATENT DOCUMENTS

| DE | 102004037257 | * | 1/2006 | ............. B60R 11/00 |
| DE | 10 2004 037 257 A1 | | 2/2006 | |

(Continued)

OTHER PUBLICATIONS

International Search Report dated Oct. 6, 2015 in PCT/FR2015/051058 filed Apr. 17, 2015.
(Continued)

*Primary Examiner* — Clayton E Laballe
*Assistant Examiner* — Kevin Butler
(74) *Attorney, Agent, or Firm* — Oblon, McClelland, Maier & Neustat, L.L.P.

(57) ABSTRACT

An arrangement for mounting a functional component on a motor vehicle bodywork element includes a trim clipped onto the bodywork element and provided with an outer flange bearing against an outer face of the bodywork element and a support to which the functional component is fixed. The support is clipped to the trim. The support includes a central boss to which the functional component is fixed. The boss is introduced into a housing of the trim so as to position the functional component opposite an opening formed in an end wall of the trim. The support also includes a dished formation inside which the boss is located. Peripheral edges of the dished formation are extended forward to (Continued)

contact and interact with an inner face of the bodywork element.

11 Claims, 2 Drawing Sheets

(51) Int. Cl.
| | | |
|---|---|---|
| *F16M 13/02* | (2006.01) | |
| *F16M 11/04* | (2006.01) | |
| *F16M 11/10* | (2006.01) | |
| *G01D 11/24* | (2006.01) | |
| *B60R 11/00* | (2006.01) | |

(52) U.S. Cl.
CPC . *B60R 2011/004* (2013.01); *B60R 2011/0045* (2013.01); *B60Y 2306/01* (2013.01); *F16M 11/04* (2013.01); *F16M 11/041* (2013.01); *F16M 11/10* (2013.01); *G01D 11/245* (2013.01)

(58) Field of Classification Search
USPC .......................................................... 396/419
See application file for complete search history.

(56) References Cited

FOREIGN PATENT DOCUMENTS

| DE | 20 2011 052 546 U1 | 5/2013 | |
|---|---|---|---|
| DE | 202011052546 * | 5/2013 | ............. B60R 11/00 |
| EP | 2 722 234 A1 | 4/2014 | |

OTHER PUBLICATIONS

French Search Report dated Aug. 20, 2014 in French Patent Application 1 454971 filed Jun. 2, 2014.

\* cited by examiner

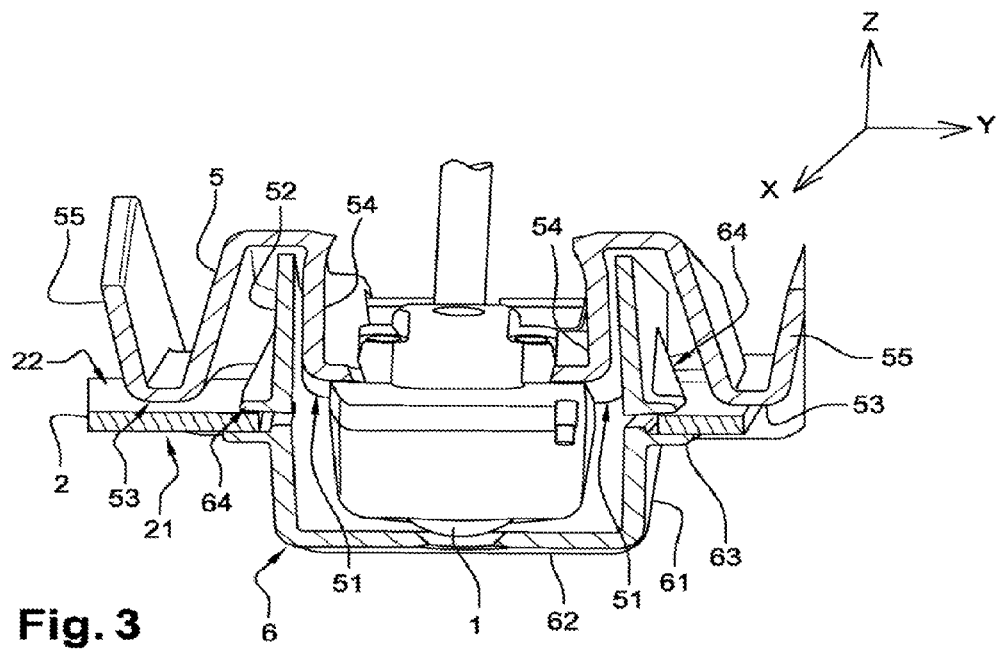
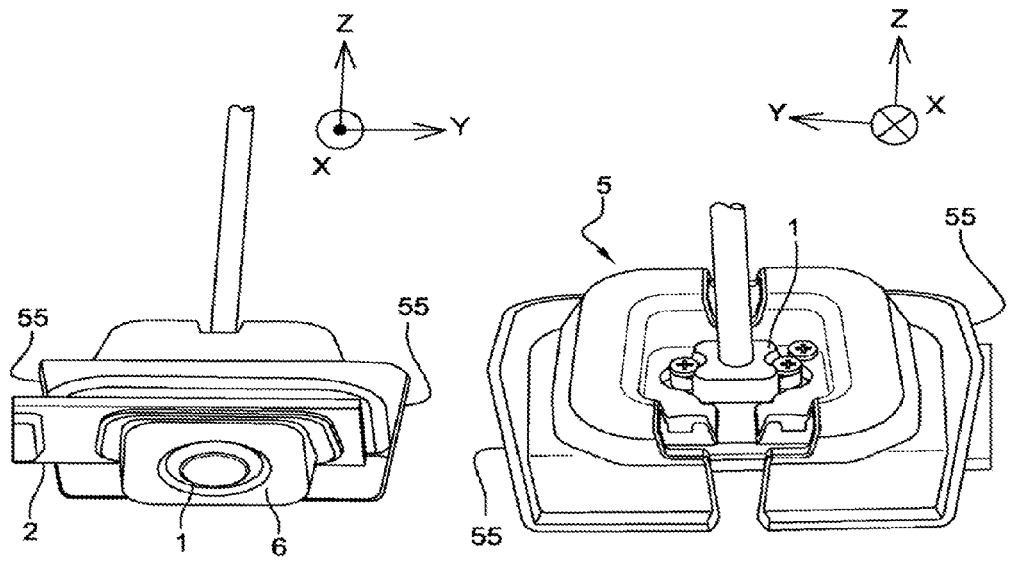
Fig. 3
Fig. 4    Fig. 5

ARRANGEMENT FOR MOUNTING A FUNCTIONAL COMPONENT SUCH AS A CAMERA ON A MOTOR VEHICLE BODYWORK ELEMENT

TECHNICAL FIELD

The present invention relates to an arrangement for mounting a functional component such as a camera on a motor vehicle bodywork element, comprising a trim clipped onto the bodywork element and provided with an outer flange bearing against an outer face of the bodywork element, the arrangement also comprising a support to which the functional component is fixed, the support being clipped to the trim.

PRIOR ART AND PROBLEM POSED

Reversing cameras, which are fitted to some vehicles, are usually fixed to the rear trunk lids of the vehicles. Other camera installation sites are found, notably on the rear fascia of the vehicle, which is a part of the bodywork that may be deformed, notably as a result of minor impacts, and may have non-negligible geometric variation. This however gives rise to problems of positioning and retention of geometry. The camera and its casing must withstand minor impacts on the fascia without any deterioration in the functionality of the camera.

Object of the Invention

The object of the invention is to overcome some or all of the above problems by proposing an ingenious mounting arrangement according to the invention on the fascia of the vehicle.

SUBJECT OF THE INVENTION

To this end, the invention relates to an arrangement for mounting a functional component on a motor vehicle bodywork element, comprising a trim clipped onto the bodywork element and provided with an outer flange bearing against an outer face of the bodywork element, the arrangement also comprising a support to which the functional component is fixed, the support being clipped to the trim, characterized in that the support comprises a central boss to which the functional component is fixed, this boss being introduced into a housing of the trim so as to position the functional component opposite an opening formed in an end wall of the trim, the support also comprising a dished formation inside which the boss is located, peripheral edges of the dished formation being extended forward to come into contact and interact with an inner face of the bodywork element.

Thus the dished formation provides a wider base for the camera support, offering more extended bearing areas between the support and the bodywork element, in such a way that this support is pressed in the best way against an inner face of the bodywork element and has maximum stability imparted to it, while the geometric variation is limited.

According to other advantageous characteristics of the invention:
the support comprises a groove delimited internally by the central boss and externally by the peripheral edges, this groove receiving a free edge of the trim,
the peripheral edges are prolonged in the opposite direction from the inner face of the bodywork element by outer walls extending substantially perpendicularly to the inner face of the bodywork element,
the direction of insertion of the central boss of the support into the housing of the trim is inclined at an angle of between 30° and 60° to the inner face of the bodywork element with which the peripheral edges of the support come into contact and interact,
the functional component is a camera,
the trim and the support are parts made of plastic material,
the bodywork element is a fascia of a motor vehicle, notably a rear fascia.

The invention also relates to a motor vehicle instrument comprising an arrangement having all or some of the preceding characteristics.

BRIEF DESCRIPTION OF THE DRAWINGS

The invention will be more readily understood by a perusal of the following description of a non-limiting example of the invention, and in the light of the appended drawings, in which:

FIG. 3 shows a perspective view, with a cross section taken in a transverse plane, of the arrangement according to the invention, FIG. 4 shows a perspective view of the arrangement according to the invention, from the outside of the fascia and toward the front of the vehicle, and FIG. 5 shows a perspective view of the arrangement according to the invention, from the inside of the fascia and toward the rear of the vehicle.

DETAILED DESCRIPTION

For the purposes of the description, the directions and orientations are indicated in relation to the reference frame XYZ conventionally used in automobile design, in which X is the longitudinal direction from the front to the rear of the vehicle, running toward the rear, Y is the transverse direction to the vehicle, running toward the right, and Z is the vertical direction, running upwards.

The concepts of front and rear are to be understood with respect to the ordinary direction of travel of the vehicle, which is directed forward.

The term "substantially" indicates that a slight deviation is acceptable relative to a given nominal position or arrangement, while remaining within the context of the invention. For example, "substantially vertical" indicates that a deviation of about 10° from a strictly vertical orientation is acceptable in the context of the invention.

Figure 1:
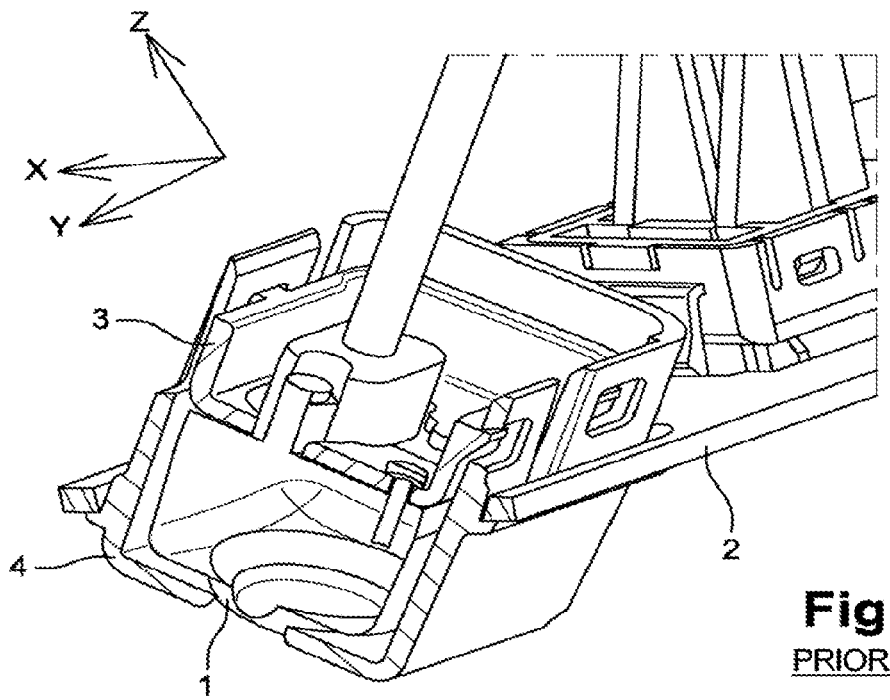
FIG. 1 shows a conventional arrangement for mounting a functional component on a bodywork element according to the prior art.

FIG. 1 shows a known arrangement for mounting a functional component 1 on a bodywork element 2 of a motor vehicle. The functional component 1 is typically a camera mounted on a support 3, which is fixed to a trim 4 mounted integrally on the bodywork element 2, which in the illustrated example is a rear fascia of the vehicle. The camera is held on the support 3 by means of fixing screws. The terms "functional component" and "bodywork element" will be retained in the rest of the description, on the understanding that they may be replaced by "camera" and "rear fascia" in the illustrated exemplary embodiment, but may also cover other concepts, for example a radar unit or a front fascia, or the like. The trim 4 has an aesthetic function around the functional component 1, but in fact is also an interface component or an alternative support holding the functional component 1 and its support 3 on the bodywork element 2. In the prior art arrangement, the support 3 has a compact shape and is fully inserted into a recess in the trim 4. Resilient clip means fix the support 3 and the functional component 1 to the trim. The geometrical positioning of the assembly relative to the bodywork element 2 is provided solely by means of a flange provided on the outer walls of the trim 4, this flange forming a shoulder which bears on an outer face of the bodywork element. This flange has the general shape of a rib formed around the generally parallelepipedal body of the trim 4.

The invention shown in FIGS. 2 to 5 also includes a support 5 on which the functional component 1 is mounted, a trim 6 on which the support 5 and the functional component 1 are mounted, and the bodywork element 2 to which the assembly is fixed. The bodywork element 2, the functional component 1 and the trim are identical to those of the prior art according to FIG. 1.

Figure 2:
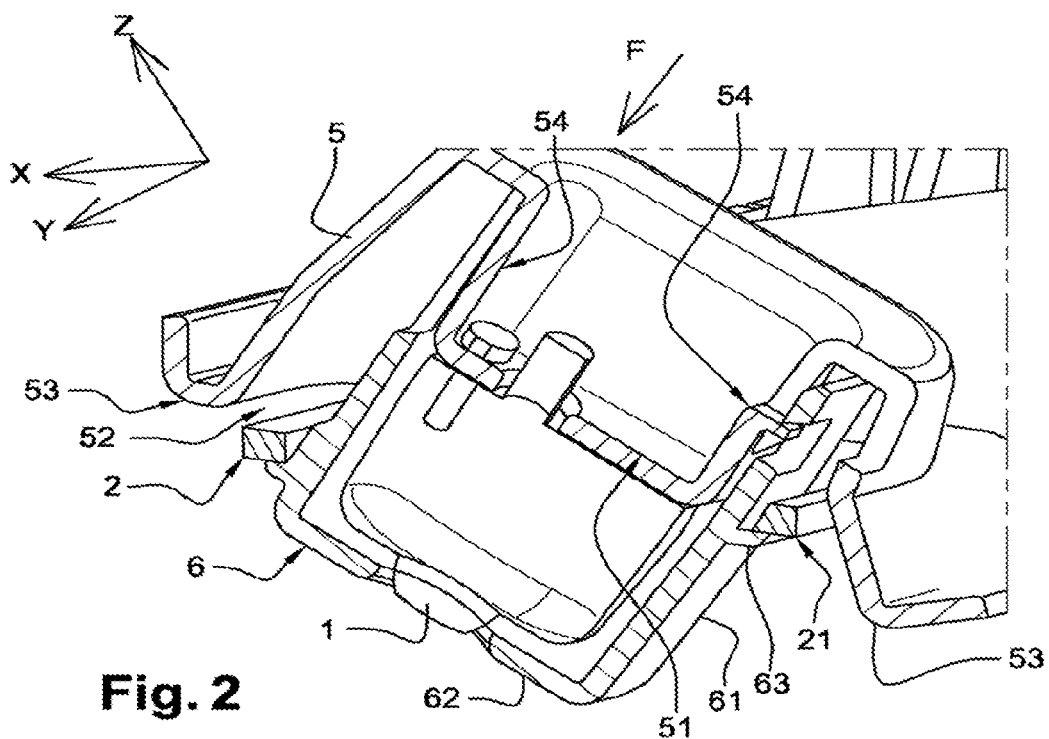
FIG. 2 shows a perspective view, with a cross section taken in a longitudinal vertical plane, of the arrangement according to the invention.

The trim 6 has a generally parallelepipedal shape, delimited by side walls 61 and an end wall 61. The end wall 61 has an opening through which the functional component 1, typically a camera previously inserted into an inner housing of the trim 6, can access a field of view which in this case is located behind the vehicle. At the opposite end from the end wall 62, the trim 6 has an opening through which the functional component 1 is inserted into the flange 6 in the direction of the arrow F (FIG. 2). The trim 6 has a cross section of generally square shape, as seen in a section perpendicular to the direction of the arrow F.

The trim 6 comprises an outer flange 63 in the form of a rib extending along the outer faces of the side walls 61. This flange 63 forms a shoulder having a flat bearing face designed to contact and interact with an outer face 21 of the bodywork element 2. With reference to FIG. 3, the trim 6 comprises resilient lugs 64 which contact and interact with the edge of an opening formed in the bodywork element 2, so that the lugs are deformed toward the inside of the trim and are able to pass through. The resilient lugs 64 return to their initial position, bearing against an inner face 22 of the bodywork element 2 when the flange 63 bears on the bodywork element. Thus the trim 6 is kept locked onto the bodywork element 2. The arrangement according to the invention also comprises a support 5 to which the functional component is fixed. The support 5 comprises a central boss 51 to which the functional component 1 is fixed by means of one or more screws. The boss 51 is inserted into the inner housing of the trim 6 so that the functional component 1 is positioned facing the end wall 62 of the trim 6. The support 5 comprises a dished formation 52 inside which the boss 51 is located. The dished formation 52 comprises peripheral edges 53 which are extended forward to contact and interact with an inner face 22 of the bodywork element 2. It should be noted that the boss 51 of the support 5 has side walls 54 which are clipped onto the side walls 61 by a system of resilient lugs of the type mentioned above (FIGS. 2 and 3).

The direction of insertion of the central boss 51 of the support 5 into the housing of the trim 6 is inclined at an angle of between 30° and 60°, for example 45°, to the plane of the inner face 22 of the bodywork element 2 with which the peripheral edges 53 of the support 5 come into contact and interact.

Because of the presence of the boss 51 in the center of the dished formation 52, the support 5 has a groove delimited internally by the central boss 51 and externally by the peripheral edges 53. This groove receives a free edge of the trim 6, which delimits the opening through which the boss 51 and the functional component 1 are inserted into the housing of the trim 6.

The peripheral edges 53 are prolonged in the opposite direction from the inner face 22 of the bodywork element 2 by outer walls 55 extending substantially perpendicularly to the inner face 22 of the bodywork element 2. These outer walls 55, in combination with the dished formation 52 and the central boss 51 of the support 5, contribute by their S-shaped arrangement to the stiffening of the support to which the functional component is rigidly fixed.

The peripheral edges 53 of the support 5 comprise a substantially flat part, extended forward, which contacts and interacts with the inner face 22 of the bodywork element 2. This contact area of the peripheral edges 53 forms a bearing base arranged around the whole of the functional component 1 and at a distance therefrom, thus contributing in a major way to the geometric positioning of the functional component 1 relative to the bodywork element 2. The distance between the central axis of the functional component 1 and the contact area of the peripheral edges 53 is typically between 30 and 60 mm.

The outer walls 55 of the support 5 may also be elements which form spacers bearing on internal elements (not shown) of the bodywork element or of the structure of the vehicle. Thus these elements, when stressed in compression along the axial direction of the vehicle, provide a safety compartment for the functional component to prevent it from being crushed or damaged if an impact occurs.

The trim 6 and the support 5 are parts made of plastic material, for example but not exclusively by injection molding. Their thickness is between 1 and 5 mm. The bodywork element 2 is also typically made of plastic material.

Clearly, the invention is not limited to the embodiments or variant embodiments described above, but comprises all technical equivalents of these means.

The invention claimed is:

1. An arrangement for mounting a functional component on a motor vehicle bodywork element, comprising:
    a trim clipped onto the bodywork element and provided with an outer flange bearing against an outer face of the bodywork element; and
    a support to which the functional component is fixed, the support being clipped to the trim,
    wherein the support comprises a central boss to which the functional component is fixed, the boss being introduced into a housing of the trim so as to position the functional component opposite an opening formed in an end wall of the trim,
    wherein the support comprises a dished formation inside which the boss is located, peripheral edges of the dished formation being extended from the central boss to contact and interact with an inner face of the bodywork element,
    wherein the support comprises a groove delimited internally by the central boss and externally by the peripheral edges, the groove receiving a free edge of the trim, and
    wherein the support includes outer walls that extend from portions of the peripheral edges that contact and interact with the inner face of the bodywork element and the outer walls are positioned radially outside of the peripheral edges with respect to a central axis of the support.

2. The arrangement as claimed in claim 1, wherein the outer walls extend substantially perpendicularly to the inner face of the bodywork element.

3. The arrangement as claimed in claim 1, wherein a direction of insertion of the central boss of the support into the housing of the trim is inclined at an angle of between 30° and 60° to the inner face of the bodywork element with which the peripheral edges of the support come into contact and interact.

4. The arrangement as claimed in claim 1, wherein the functional component is a camera.

5. The arrangement as claimed in claim 1, wherein the trim and the support are parts made of plastic material.

6. The arrangement as claimed in claim 1, wherein the bodywork element is a fascia of a motor vehicle.

7. The arrangement as claimed in claim 1, wherein the bodywork element is a rear fascia of a motor vehicle.

8. A motor vehicle, comprising:
the arrangement as claimed in claim 1.

9. The arrangement as claimed in claim 1, wherein the portions of the peripheral edges that contact and interact with the inner face of the bodywork element are substantially flat.

10. The arrangement as claimed in claim 1, wherein the trim clipped onto the bodywork element includes resilient lugs to bear against an inner face of the bodywork element.

11. An arrangement for mounting a functional component on a motor vehicle bodywork element, comprising:

a trim clipped onto the bodywork element and provided with an outer flange bearing against an outer face of the bodywork element; and a support to which the functional component is fixed, the support being clipped to the trim, wherein the support comprises a central boss to which the functional component is fixed, the boss being introduced into a housing of the trim so as to position the functional component opposite an opening formed in an end wall of the trim, wherein the support comprises a dished formation inside which the boss is located, peripheral edges of the dished formation being extended forward to contact and interact with an inner face of the bodywork element, and wherein a direction of insertion of the central boss of the support into the housing of the trim is inclined at an angle of between 30° and 60° to the inner face of the bodywork element with which the peripheral edges of the support come into contact and interact.

* * * * *